US005912792A

United States Patent [19]

Shirakawa et al.

[11] Patent Number: 5,912,792

[45] Date of Patent: Jun. 15, 1999

[54] MOUNTING CONSTRUCTION OF A TANK-TYPE LIGHTNING ARRESTER FOR A NEUTRAL POINT OF A TRANSFORMER

[75] Inventors: Shingo Shirakawa, Hitachi; Makoto Matsuzaki, Hiroshima-ken; Eichi Okamoto, Hiroshima, all of Japan

[73] Assignees: Hitachi, Ltd., Tokyo; Chugoku Electric Mfg. Co., Ltd., Hiroshima, both of Japan

[21] Appl. No.: 09/006,208

[22] Filed: Jan. 13, 1998

[30] Foreign Application Priority Data

Jan. 28, 1997 [JP] Japan .................................... 9-014009

[51] Int. Cl.[6] ........................................................ H02H 7/04

[52] U.S. Cl. .............................................. 361/40; 361/117

[58] Field of Search .................................. 361/35, 38, 40, 361/117, 118, 120, 121, 127, 131, 132, 135, 124, 603, 623

[56] References Cited

U.S. PATENT DOCUMENTS 4,489,361 12/1984 Kitamura ................................ 361/333
4,679,113 7/1987 Book et al. ................................ 361/40
4,754,363 6/1988 Kirch et al. ............................. 361/120
4,975,797 12/1990 Veverka et al. ........................... 361/35
5,124,687 6/1992 Okumura et al. ....................... 340/647

*Primary Examiner*—Jeffrey Gaffin
*Assistant Examiner*—Kim N. Huynh
*Attorney, Agent, or Firm*—Fay, Sharpe, Beall, Fagan, Minnich & McKee

[57] ABSTRACT

A mounting construction of a tank-type lightning arrester for a neutral point of a transformer includes a transformer having a transformer winding contained within a transformer tank, the transformer winding having a neutral point, and a tank-type lightning arrester having an overvoltage protection element contained within a lightning arrester tank. A first opening is formed in an upper portion of a side surface of the transformer tank, and a second opening is formed in the lightning arrester tank, and the first and second openings are connected together through an insulating spacer having a central conductor, and the neutral point of the transformer winding is connected to the overvoltage protection element via the central conductor. The lightning arrester tank is supported solely by a mounting portion provided on a side surface of the transformer tank.

6 Claims, 6 Drawing Sheets

MOUNTING CONSTRUCTION OF A TANK-TYPE LIGHTNING ARRESTER FOR A NEUTRAL POINT OF A TRANSFORMER

BACKGROUND OF THE INVENTION

The present invention relates to a mounting construction of a lightning arrester for a neutral point of a transformer, and more particularly to a mounting construction of a tank-type lightning arrester for a neutral point of a transformer.

As shown in FIG. 5, a conventional power transformer, having a capacity of 6 KV to 154 KV, is operated in a resistance grounded system, and a lightning arrester 3 is connected to a neutral point 2*a* of transformer windings 2 of the power transformer 1 so as to protect the transformer 1 from an overvoltage.

One example of such conventional technique is an insulator-type lightning arrester, and as shown in FIG. 6, the lightning arrester 7 is mounted on an upper portion of a transformer 4 or a mounting base, and a neutral point of the transformer is connected to the lightning arrester 7 via a bushing 6. Another example is a tank-type lightning arrester, and as shown in FIG. 7, a neutral point 2*a* of a transformer 2 is connected to a tank-type lightning arrester 12 via an oil-gas bushing 10, projecting from a transformer tank 9, and a disconnecting switch 11. The tank-type lightning arrester 12 is mounted on a mounting base 13 mounted on the earth.

Japanese Patent Examined Publication No. 6-30286 discloses an example in which a lightning arrester is arranged parallel to a neutral grounding resistor within a tank.

However, in the mounting construction of the conventional insulator-type lightning arrester shown in FIG. 6, the lightning arrester 7 is inferior in earthquake resistance and anti-pollution characteristics. In the mounting construction of the tank-type lightning arrester 12 shown in FIG. 7, the drawback of the insulator-type lightning arrester has been overcome, and there has been achieved an advantage that this tank-type lightning arrester can be easily disconnected from the transformer 2 when effecting a voltage-withstanding test of the transformer. However, since the oil-gas bushing 10 of which creeping distance is long and which requires a long extension distance for connection from a transformer tank 9 is provided for connecting the transformer 2 to the tank-type lightning arrester 12, the distance L1 between the transformer 2 and the tank-type lightning arrester 12 is long, and a large installation area is required for installing the tank-type lightning arrester 12, and this is not economical.

In the conventional construction disclosed in Japanese Patent Examined Publication No. 6-30286, any mounting bracket member is not formed on a side surface of the tank, and therefore a large installation area is required for installing the lightning arrester.

SUMMARY OF THE INVENTION

With the above problems in view, it is an object of the present invention to provide a mounting construction of a tank-type lightning arrester for a neutral point of a transformer, which enables the reduction of an installation area for the tank-type lightning arrester, and is compact in size, and is economical.

According to one aspect of the present invention, there is provided a mounting construction of a tank-type lightning arrester for a neutral point of a transformer. The transformer includes a cooling medium and a transformer winding having a neutral point contained within a transformer tank. The tank-type lightning arrester includes a cooling medium and an overvoltage protection element contained within a lightning arrester tank. The lightning arrester tank is supported by a mounting portion provided on a side of the transformer tank, and the neutral point of the transformer winding and the overvoltage protection element are interconnected through a central conductor supported by an insulating spacer separating the cooling medium in the lightning arrester tank.

According to another aspect of the present invention, a sound-insulating tank cover said tansformer tank and lightning arrester tank is supported by a mounting portion provided on a side surface of the sound insulating tank.

DESCRIPTION OF THE PREFERRED EMBODIMENTS

A mounting construction of the present invention will now be described with reference to FIGS. 1 and 2.

Figure 1:
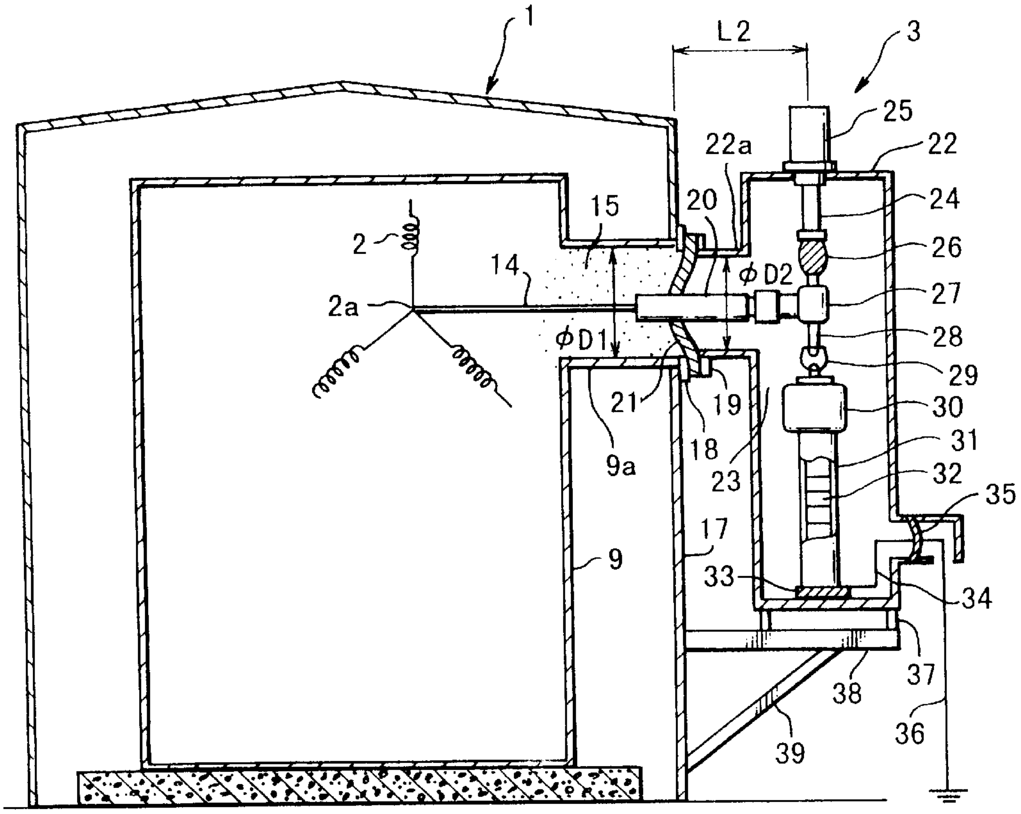
FIG. 1 is a cross-sectional view of a mounting structure of a tank-type lightning arrester, which includes a disconnecting switch, for a neutral point of a transformer (during operation) according to the present invention.

FIG. 1 shows an operation state in which a disconnecting switch 24 is closed. On the other hand, FIG. 2 shows a state of a voltage-withstanding test, in which the disconnecting switch 24 is opened.

Figure 2:
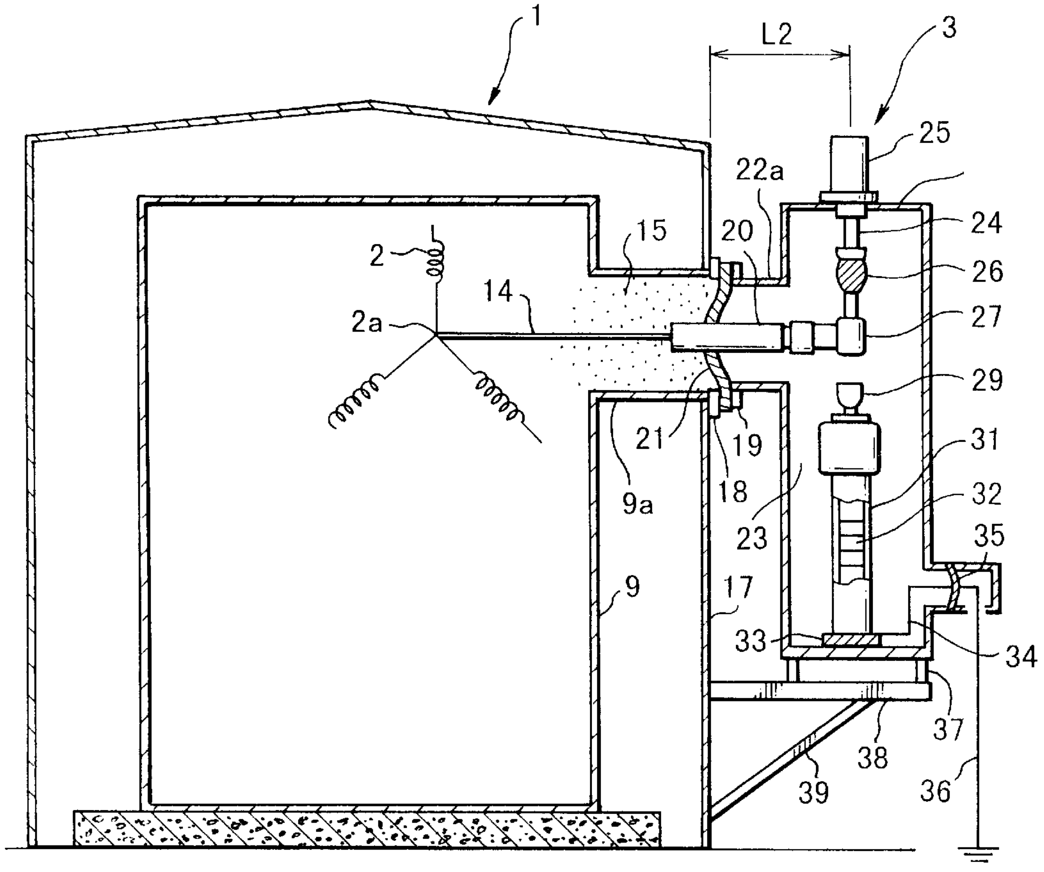
FIG. 2 is a cross-sectional view of the lightning arrester-mounting construction shown in FIG. 1 (at the time of a voltage-withstanding test)

In Figs. 1 and 2, reference numeral 1 denotes a transformer, reference numeral 2 transformer windings, reference numeral 3 a tank-type lightning arrester, reference numeral 2*a* a neutral point of the transformer windings 2, reference numeral 14 a transformer-side neutral point connection conductor, reference numeral 15 transformer oil, reference numeral 9 a transformer tank, reference numeral 9*a* a transformer tank-side sheath, reference numeral 17 a sound-insulating tank, reference numeral 18 a transformer-side flange, reference numeral 19 a lightning arrester-side flange, reference numeral 20 a central conductor connecting the transformer-side conductor 14 to the tank-type lightning arrester 3, reference numeral 21 a spacer which separates the transformer oil 15 from SF6 gas in a lightning arrester tank, and supports the central conductor 20, reference numeral 22 the lightning arrester tank, reference numeral 22*a* a lightning arrester tank-side sheath, reference numeral 23 the SF6 gas, reference numeral 24 the disconnecting switch, reference numeral 25 a drive device for the disconnecting switch 24, reference numeral 26 an insulator, reference numeral 27 a conductor, reference numeral 28 a connection conductor, reference numeral 29 a contact, reference numeral 30 a head shield, reference numeral 31 an insulating tube, reference numeral 32 a zinc oxide element used as an overvoltage protection element, reference numeral 33 an insulating plate, reference numeral 34 a connection conductor, reference numeral 35 a sealed terminal, reference numeral 36 a ground wire (earth wire), and reference numerals 37 to 39 mounting bracket members.

In order to connect the transformer neutral point 2*a* to the lightning arrester 3, an extension portion projects from a side surface of the transformer tank 9 toward the lightning arrester 3, and is open at its distal end, and this opening, an opening in the sound-insulating tank side plate 17 of the transformer, and the transformer-side flange 18 are joined together to form a transformer-side opening. An opening, having the lightning arrester-side flange 19, is formed at that portion of the lightning arrester tank 22 corresponding to the transformer-side opening.

At these openings, the transformer tank 9 and the lightning arrester tank 22 are connected together by the transformer-side flange 18 and the lightning arrester-side flange 19 through the spacer 21. The spacer 21 isolates the transformer oil 15 from the SF6 gas 23 in the lightning arrester tank 22, and also supports the central conductor 20 which connects the transformer-side conductor 14 to the lightning arrester-side conductor 27. A central portion of the insulating spacer 21 is projected into the oil in the transformer tank 9.

With respect to the configuration of those portions of the transformer tank 9 and the lightning arrester tank 22 connected together, an inner diameter ΦD1 of the transformer tank-side sheath 9*a* is larger than an inner diameter ΦD2 of the lightning arrester tank-side sheath 22*a*. This construction is achieved, utilizing an advantage that the pressure of the SF6 gas, sealed in the lightning arrester tank 22, can be made higher than the pressure of the transformer oil 15 in the transformer tank 9 and therefore the outer diameter of the lightning arrester tank-side sheath 22*a* can be made smaller than that of the transformer tank-side sheath 9*a*.

The lightning arrester tank 22 is supported by the mounting bracket members 37, 38, 39 mounted on the sound-insulating tank side plate 17 of the transformer 1. The central conductor 20 is connected to the lightning arrester body 30 via the conductor 27, the connection conductor 28 of the disconnecting switch 24 and the contact 29 of the disconnecting switch 24. The body 30 of the lightning arrester 3 comprises the insulating tube 31 having the overvoltage protection element 32 (e.g. zinc oxide element) contained therein, and the ground side of the lightning arrester 3 is insulated from the mounting bracket members 37, 38, 39 by the insulating plate 33, and is connected to the ground wire 36 via the connection conductor 34.

The disconnecting switch 24 comprises the disconnecting switch drive device 25, the insulator 26, the conductor 27, the connection conductor 28 and the contact 29, and the connection conductor 28 is driven to be moved vertically (i.e., upward and downward) from the outside of the lightning arrester 3.

When the voltage-withstanding test is to be conducted, the disconnecting switch 24 is opened as shown in FIG. 2.

Next, a mounting construction of the present invention which is applied to a tank-type lightning arrester which does not include a disconnecting switch will be described with reference to FIG. 3.

Figure 3:
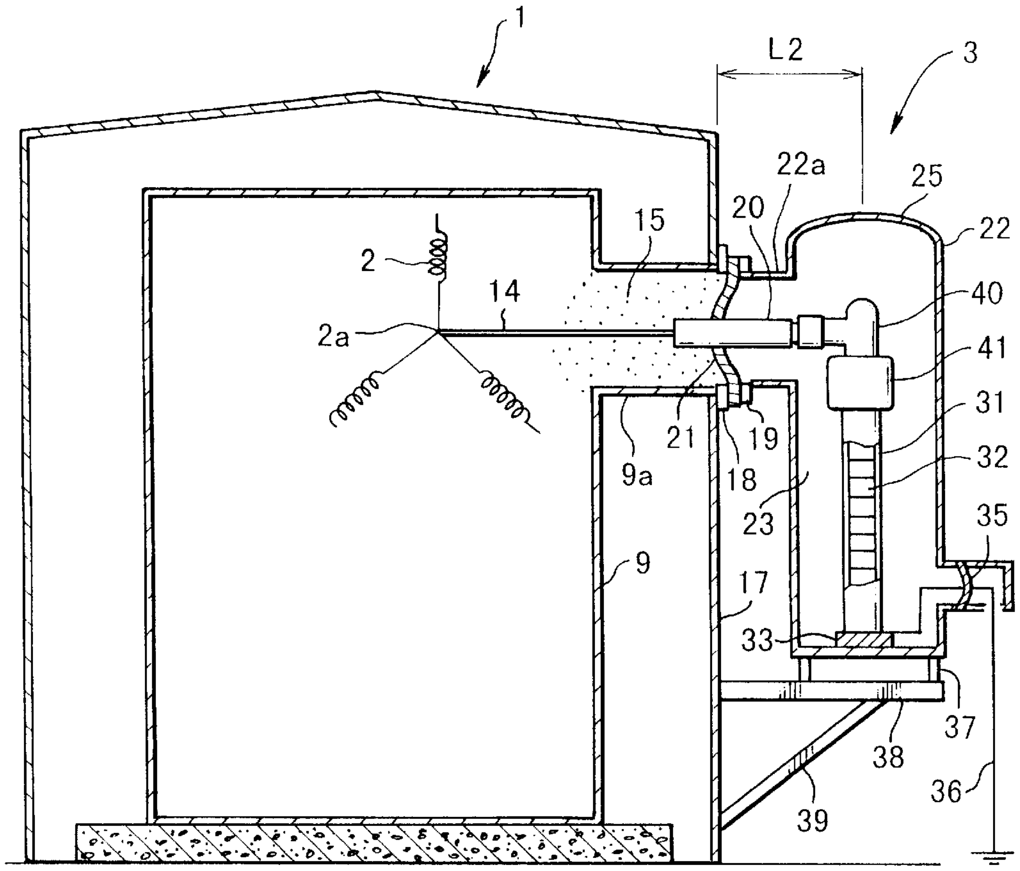
FIG. 3 is a cross-sectional view of a mounting structure of a tank-type lightning arrester, which does not include a disconnecting switch, for a neutral point of a transformer according to the invention.

In FIG. 3, those portions identical to those of FIGS. 1 and 2 will be designated by identical reference numerals, respectively, and explanation thereof will be omitted.

In FIG. 3, reference numeral 40 denotes a conductor, and in this embodiment, a central conductor 20 is connected directly to the lightning arrester via the conductor 40. Thus, this embodiment differs from the first embodiment shown in FIGS. 1 and 2 in that the disconnecting switch is not provided.

In this embodiment, when the transformer 1 is to undergo a voltage-withstanding test, the tank-type lightning arrester 3 itself is disconnected from the transformer, and then the test is conducted, and after this test is finished, the lightning arrester 3 is connected to the transformer 1.

As described in the above embodiments, the above mounting construction can be adapted regardless of whether or not the tank-type lightning arrester is provided with the disconnecting switch.

Figure 4:
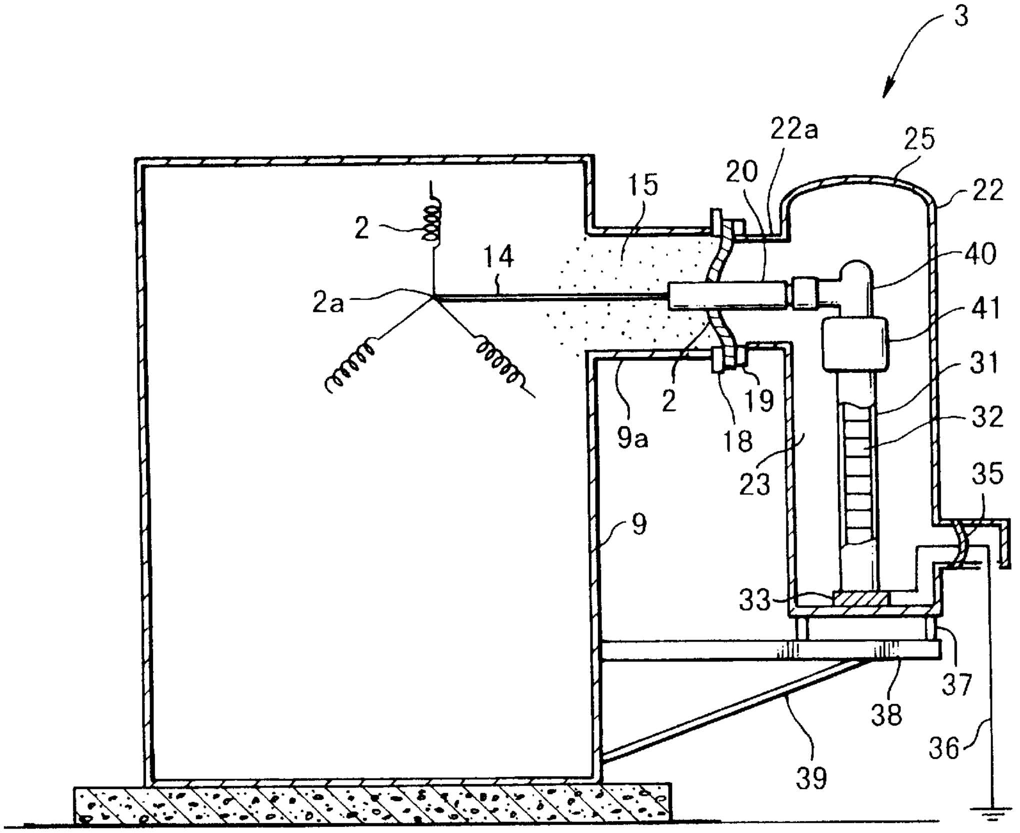
FIG. 4 is a cross-sectional view of a second embodiment of a mounting structure of a tank-type lightning arrester for a neutral point of a transformer according to the present invention.
Figure 5:
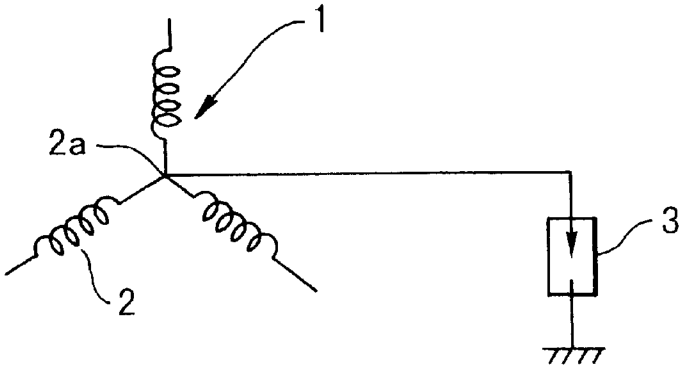
FIG. 5 is a view showing a connection arrangement of a lightning arrester for a neutral point of a conventional power transformer.
Figure 6:
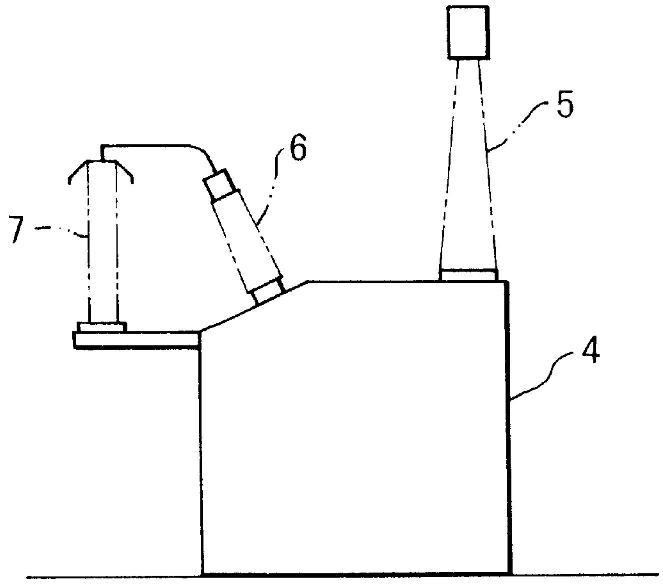
FIG. 6 PRIOR ART
FIG. 6 is a schematic view showing a conventional mounting construction of an insulator-type lightning arrester for a neutral point of a transformer.
Figure 7:
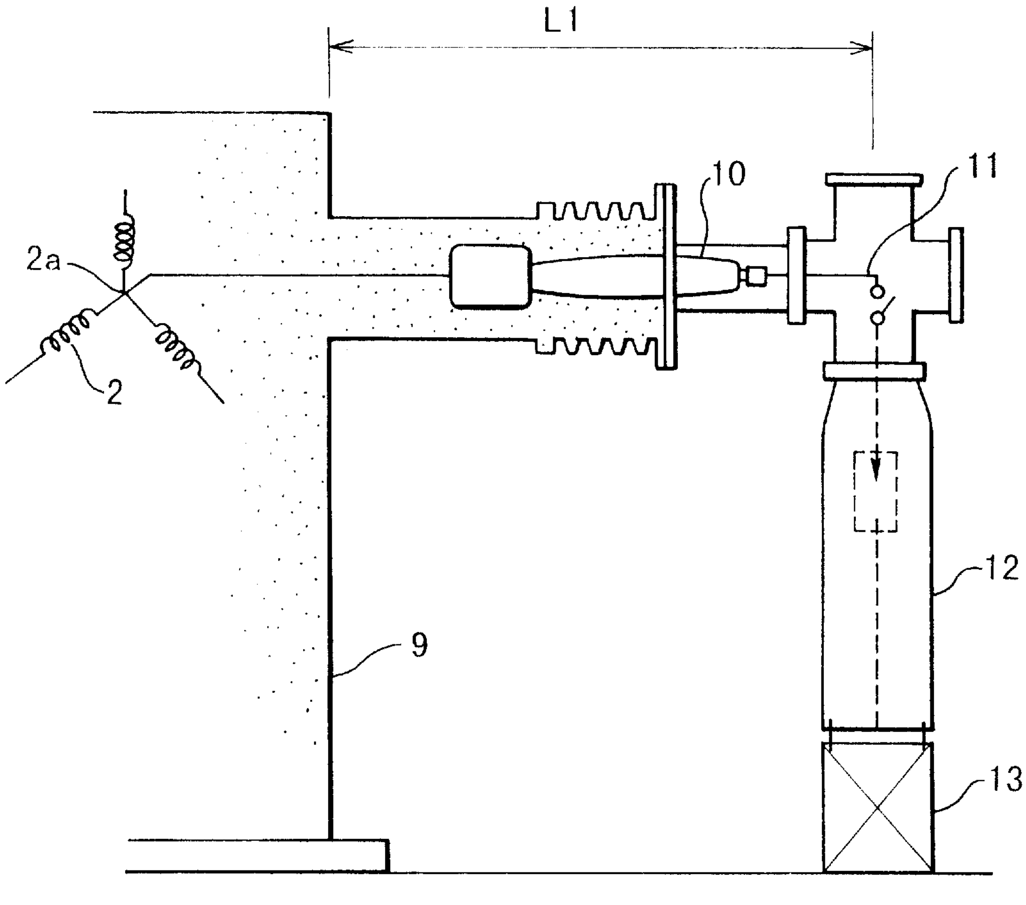
FIG. 7 PRIOR ART
FIG. 7 is a schematic view showing a conventional mounting construction of a tank-type lightning arrester for a neutral point of a transformer.

FIG. 4 shows another embodiment of the present invention in which a mounting construction of the present invention is applied to a transformer tank 9 without a sound-insulating tank or a transformer tank 9 acting also a sound-insulating tank. In the embodiment, a lightning arrester tank 22 is supported or mounted on a side surface of the transformer tank 9 by means of mounting brackets 37, 38, 39. An opening is formed at an upper portion of the side surface of the transformer tank 9 and an opening is formed at the lightning arrester tank 22. These openings are joined together through an insulating spacer 21. A diameter of the opening at the transformer tank 9 is larger than that of the opening at the lightning arrester tank 22. A central portion of the insulating spacer 21 having a central conductor 20 is projected into the transformer tank side. Other structure is the same as the above embodiments and therefore description thereof is omitted.

In the above-described embodiments, the lightning arrester 3 is supported on the mounting bracket members provided on the side surface of the transformer tank 9 or the side plate 17 of the sound-insulating tank for the transformer 1. Therefore, there is no need to provide a mounting base for mounting the lightning arrester 3 separately from the transformer 1 as is in the prior art constructions and it is possible to bring the lightning arrester 3 close to the side surface of the transformer tank 9 or the side plate 17 of the sound-insulating tank for the transformer 1. As a result, the distance between the transformer 1 and the lightning arrester 3 becomes shorter (L2<L1) and the area and space required for installing the lightning arrester 3 can be reduced. Further, it is possible to interconnect the transformer tank 9 and the lightning arrester tank 22 through the insulating spacer 21 without using the bushing like the prior arts.

As described above, in the present invention, the distance of connection between the tank-type lightning arrester and the transformer can be reduced, and the installation area can be reduced, and the space-saving power transformer with the neutral point lightning arrester can be achieved.

What is claimed is:

1. A mounting construction of a tank-type lightning arrester for neutral point of a transformer comprising:

a transformer including a cooling medium and a transformer winding having a neutral point contained within a transformer tank; and a tank-type lightning arrester including a cooling medium and an overvoltage protection element contained within a lightning arrester tank;

wherein said lightning arrester tank is supported solely by a mounting portion provided on a side surface of said transformer tank, and said neutral point of said transformer winding and said overvoltage protection element are interconnected through a central conductor supported by an insulating spacer separating the cooling medium in said transformer tank and the cooling medium in said lightning arrester tank.

2. A mounting construction according to claim 1, wherein said transformer tank has a first opening provided at an upper portion of a side surface of said transformer tank and said lightning arrester tank has a second opening provided at side surface of said lightning arrester tank and said first and second openings are interconnected through said insulating spacer.

3. A mounting construction according to claim 2, wherein said first opening has a diameter larger than that of said second opening and said insulating spacer has a central portion projected toward a side of said transformer tank.

4. A mounting construction of a tank-type lightning arrester for a neutral point of a transformer comprising:

a transformer including a cooling medium and a transformer winding having a neutral point contained within a transformer tank;

a sound-insulating tank covering said transformer tank; and a tank-type lightning arrester including a cooling medium and an overvoltage protection element contained within a lightning arrester tank;

wherein said lightning arrester tank is supported solely by a mounting portion provided on a side surface of said sound-insulating tank, and said neutral point of said transformer winding and said overvoltage protection element are interconnected through a central conductor supported by an insulating spacer separating the cooling medium in said transformer tank and the cooling medium in said lightning arrester tank.

5. A mounting construction according to claim 4, wherein said transformer tank and said sound-insulating tank have a first opening provided at an upper portion of a side surface of said transformer tank and an upper portion of a side surface of said sound-insulating tank, and said lightning arrester tank has a second opening provided at side surface of said lightning arrester tank and said first and second openings are interconnected through said insulating spacer.

6. A mounting construction according to claim 5, wherein said first opening has a diameter larger than that of said second opening and said insulating spacer has a central portion projected toward a side of said transformer tank and said sound-insulating tank.

* * * * *